Jan. 5, 1965   E. R. DE VRIES ETAL   3,164,645
METHOD OF MAKING REFLEX REFLECTIVE SHEETING
Filed Oct. 11, 1961

INVENTORS
Eduard R. de Vries &
William H. Riley, Jr.

BY   Karl W. Flocks
ATTORNEY 3,164,645
METHOD OF MAKING REFLEX REFLECTIVE
SHEETING
Eduard R. de Vries, Huntingdon, and William H. Riley, Jr., Altoona, Pa., assignors to Prismo Safety Corporation, Huntingdon, Pa., a corporation of Pennsylvania
Filed Oct. 11, 1961, Ser. No. 144,425
6 Claims. (Cl. 264—1)

The present invention relates to a process for forming reflective sheeting and more particularly to a reflex light reflecting sheet material.

Heretofore several different forms of reflective sheeting have been proposed which include a light-returning layer of small transparent beads of spheres partially embedded in a bonding layer with a light reflecting means being located behind the beads. Such sheets have the property of reflecting back a brilliant cone of light toward the source of an angularly incident ray, and have been called reflex reflectors. Such reflectors are to be distinguished from specular reflectors, such as mirrors, which cause reflection of the incident light in all directions without selective return in the direction of incidence.

It is an object of the present invention to provide an improved method of manufacture of a reflex light reflecting sheeting.

It is a further object of the present invention to produce an improved form of reflex light reflecting sheeting.

Other objects and the nature and advantages of the invention will be apparent from the following description taken in conjunction with the accompanying drawings, wherein.

Figure 1:
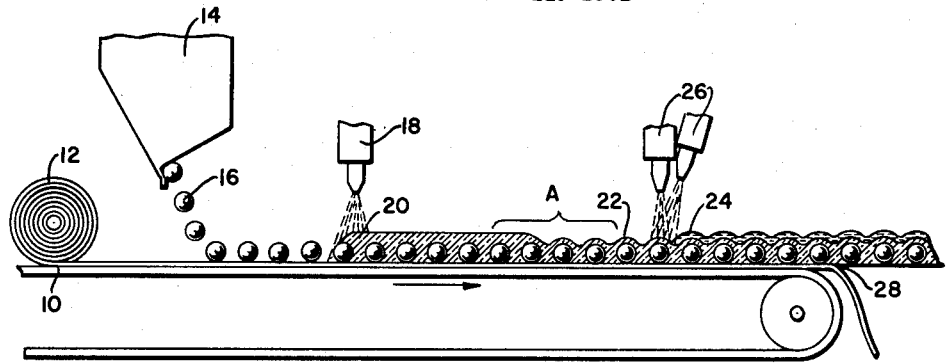
FIG. 1 is a diagrammatic sectional view showing the process of the present invention.
Figure 2:
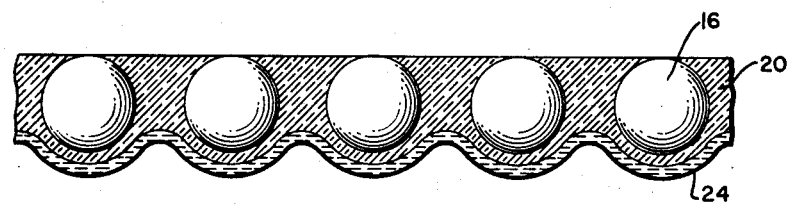
FIG. 2 is an enlarged sectional view of the sheeting made according to the present invention.
Figure 3:
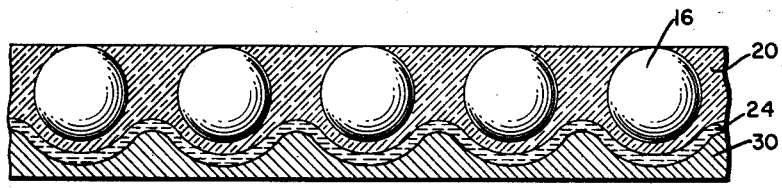
FIG. 3 is an enlarged sectional view of the sheeting of FIG. 2 with a reinforcing layer next to the reflecting layer.
Figure 4:
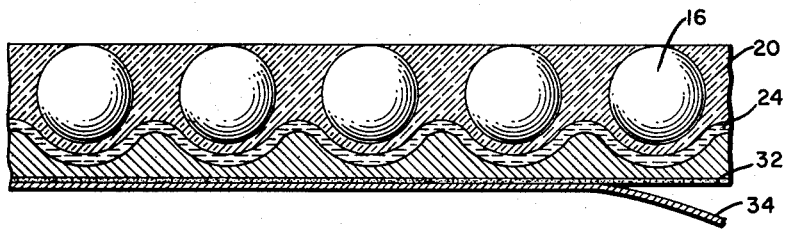
FIG. 4 is an enlarged sectional view of the sheeting of FIG. 3 with an adhesive layer and a removable liner thereon.

Referring to the drawings, FIG. 1 shows diagrammatically the method of the present invention. An endless belt arrangement 10 is provided for rendering the process continuous. A roll of pressure sensitive tape 12 is unrolled onto the moving belt and passes under a hopper 14 which dispenses small glass spheres 16 onto the tacky surface of the pressure sensitive tape 12. The glass spheres 14 stick onto the upper surface of the tacky surface in a uniform mono layer. The rate of dispensing may be adjusted to give the mono layer of spheres, or if necessary, the excess spheres not sticking to the tacky surface may be removed by blowing, vacuum or any other suitable method.

The tape 12 containing the mono layer of spheres 16 next passes beneath the nozzle 18 of a spray gun which dispenses a transparent binder material 20 onto the glass spheres. The binder material 20 flows around the beads displacing the air and yielding after solidification a substantially flat lower surface with the glass spheres 16 in point contact with the lower surface thereof. As the tape 12 continues to travel with the belt 10 at area A, the binder material solidifies by curing, cooling, solvent evaporation or the like with some shrinkage so as to conform by capillary action to the hemispherical surfaces of the glass spheres on the upper surface of the sheeting, as shown at 22. A heating means may be provided above the moving sheeting for speeding up the solidification of the binder material.

When the sheeting has hardened, a reflecting coating 24 is next formed on the upper curved surfaces of the sheeting. The reflective coating can be applied in various ways, such as by a 2-component spray gun 26 which applies a thin silver coating on the sheet. When the reflective coating has dried, the sheeting is peeled off of the pressure sensitive tape 12 as shown at 28.

If desired, a reinforcing layer 30 can be applied onto the reflective coating by spraying prior to removal from the tape. For certain purposes, a removable liner is desirable and this can be obtained by applying an adhesive coating 32 into the reinforcing layer 30, which is covered over by a removable liner sheet 34. The adhesive coating 32 should be waterproof for sheeting intended for outdoor use. It may be of a solvent-activatable type, or of a heat-activatable type, or one which may be activated to adhesiveness either by use of a solvent or use of heat. Such adhesives are normally non-tacky and require activation at the time of use to produce the desired adhesion or bonding to the base surface to which the sheeting is applied, as in making up a sign. A pressure-sensitive adhesive coating may be used, which is normally tacky and adheres to a surface against which it is pressed without need of activation. The removable liner protects the exposed back surface of the adhesive coating, and allows the sheeting to be wound in roll form without any danger of the adhesive material coming in contact with the upper surface of the sheeting. The liner can be of any of the well known types such as Holland cloth, regenerated cellulose or the like which can be readily peeled away from the adhesive surface.

The binder material 20 can be made of any suitable transparent resin that solidifies by curing, cooling, solvent evaporation or the like, in a relatively short time and with some shrinkage. Examples are methyl methacrylate, flexible epoxy resins, chloro sulfonated polyethylene, polystyrene, polypropylene, polycarbonate resin, ethyl cellulose, cellulose acetate-butyrate, and the like.

The spheres are preferably of glass; however, any suitable hard, transparent, solid material can be used having the desired index of refraction and size. The spheres may have a diameter not exceeding 40 mils, but preferably the spheres should have an average diameter not exceeding about 10 mils. Excellent results have been obtained by using spheres having an average diameter in the range of 3 to 6 mils.

Instead of using the pressure sensitive tape 12, the belt 10 may be made of a slightly tacky material. An example of such a material is Teflon.

The method of depositing the reflective coating 24 on the sheeting may be varied, as desired. Many methods have been proposed for metallizing plastic surfaces and any of these may be used. Instead of the 2-component system where silver is immediately formed, as illustrated, aluminum may be deposited by vacuum or aluminum paint or other reflecting paints may be used.

The reflecting coat is thin and assumes the curved shape of the binder material, thus yielding a curved reflecting surface behind each sphere. Such a system may be controlled so that the reflective surface is properly spaced from the spheres so that the focal point of the submerged sphere lies on the reflective surface. The curved, properly spaced reflective surface behind each sphere yields a much better reflection than is otbained in previously proposed sheetings which use a flat reflector surface. The thin layer of transparent binder between the spheres and the reflecting layer acts as a spacing film and its optimum thickness is dependent upon the index of refraction of the glass spheres and their diameters. Good results have been obtained with glass spheres having an index of refraction of 1.92–2.00 and an average diameter of 3–6 mils.

The sheeting made in accordance with the present invention has many advantages over previously proposed reflex reflective sheeting. First of all, the sheeting of this invention has a flat top since it solidifies in contact with a flat surface, and the glass spheres are all in point contact with the upper surface of the sheeting covering its entire face. The thickness of the spacing film or layer between the spheres and the reflecting coating is uniform due to the curved surface thereof, and can be controlled as desired for maximum reflection. The method is a simple continuous one that yields a uniform product at low cost.

It should be understood that the transparent binder material 20 can be of any desired color, as is conventional in the art.

It will be obvious to those skilled in the art that various changes may be made without departing from the spirit of the invention and therefore the invention is not limited to what is shown in the drawings and described in the specification, but only as indicated in the appended claims.

What is claimed is:

1. A method of making a reflex reflective sheeting which comprises applying a mono layer of small transparent glass spheres onto a flat, slightly tacky surface, said surface being non-drying and temporarily holding said spheres thereon without substantial embeddment therein applying a transparent binder material onto said spheres until said spheres are completely embedded in said binder material with a thin layer of said binder material uniformly covering the upper surfaces of said spheres, said spheres having an average diameter in the range of 3–40 mils, said binder material being a substance capable of hardening with some shrinkage so that the spacing layer of binder over the spheres assumes the curvature of the upper surfaces of the spheres when the binder material has hardened, the thickness of the covering layer of binding material being less than the radius of said spheres, applying a thin reflective coating onto the upper surface of said spacing layer of binder so that said reflective coating also assumes the curvature of the upper surface of the spheres and is evenly spaced from said spheres by said layer of binder material, and stripping said sheeting from said tacky surface to yield a flat top sheeting wherein said spheres are in point contact with the upper flat surface of said sheeting.

2. The method of claim 1 wherein a reinforcing layer of binder material is applied onto the solidified reflective coating layer to yield a flat lower surface thereon.

3. The method of claim 1 wherein said tacky surface is a pressure sensitive tape.

4. The method of claim 1 wherein said tacky surface is a moving belt and said binder material is applied by spraying as said mono layer of glass spheres on said moving belt passes below the binder spraying means.

5. A method of making a reflex reflective sheeting which comprises moving a roll of pressure sensitive tape in a horizontal direction with the tacky surface facing upwardly, applying a mono layer of small transparent glass spheres onto said tape as it passes beneath a glass sphere dispenser, applying a transparent binder material onto said spheres so that said spheres are completely embedded in said binder material with a thin layer of said binder material uniformly covering the upper surfaces of said spheres, said binder material being a substance capable of hardening with some shrinkage so that the spacing layer of binder over the spheres assumes the curvature of the upper surfaces of said spheres when the binder material has hardened, the thickness of the covering layer of binding material being less than the radius of said spheres, applying a thin reflective coating onto the upper surface of said spacing layer of binder so that said reflective coating also assumes the curvature of the upper surface of the spheres and is evenly spaced from said spheres by said layer of binder material, and stripping said sheeting from said pressure sensitive tape to yield a flat top sheeting wherein said spheres are in point contact with the upper surface of said sheeting.

6. The method of claim 5 wherein a reinforcing layer of binder material is applied onto the solidified reflective coating layer to yield a flat lower surface thereon.

References Cited by the Examiner

UNITED STATES PATENTS

| | | | |
|---|---|---|---|
| 1,082,231 | 12/13 | Nale | 18—60 |
| 1,691,721 | 11/28 | Johnson | 18—61 |
| 2,354,048 | 7/44 | Palmquist | 88—82 |
| 2,430,534 | 11/47 | Rodli | 88—82 |
| 2,454,910 | 11/48 | Carr | 18—60 |
| 2,543,800 | 3/51 | Palmquist et al. | 88—82 |
| 2,646,364 | 7/53 | Porth. | |
| 2,713,286 | 7/55 | Taylor | 88—82 |
| 2,775,994 | 1/57 | Rowe | 18—60 |

ROBERT F. WHITE, *Primary Examiner.*

MICHAEL V. BRINDISI, *Examiner.*